Dec. 15, 1953

W. S. PRAEG 2,662,449

GEAR SHAPING MACHINE

Filed Nov. 30, 1949

INVENTOR.
WALTER S. PRAEG
BY
Whittemore, Hulbert
& Belknap
ATTORNEYS

Dec. 15, 1953 W. S. PRAEG 2,662,449
GEAR SHAPING MACHINE
Filed Nov. 30, 1949 3 Sheets-Sheet 2

INVENTOR.
WALTER S. PRAEG
BY
Whittemore, Hulbert
& Belknap ATTORNEYS

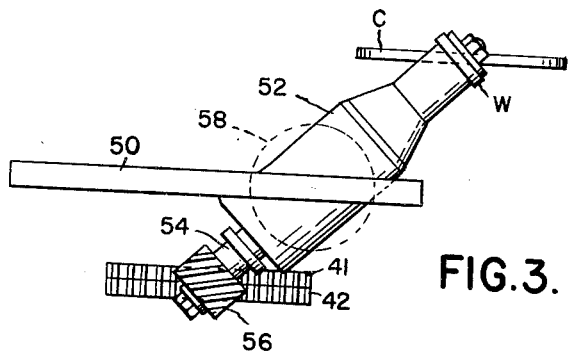
FIG.3.
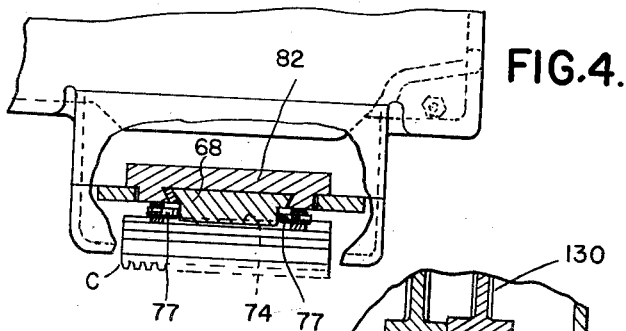
FIG.4.
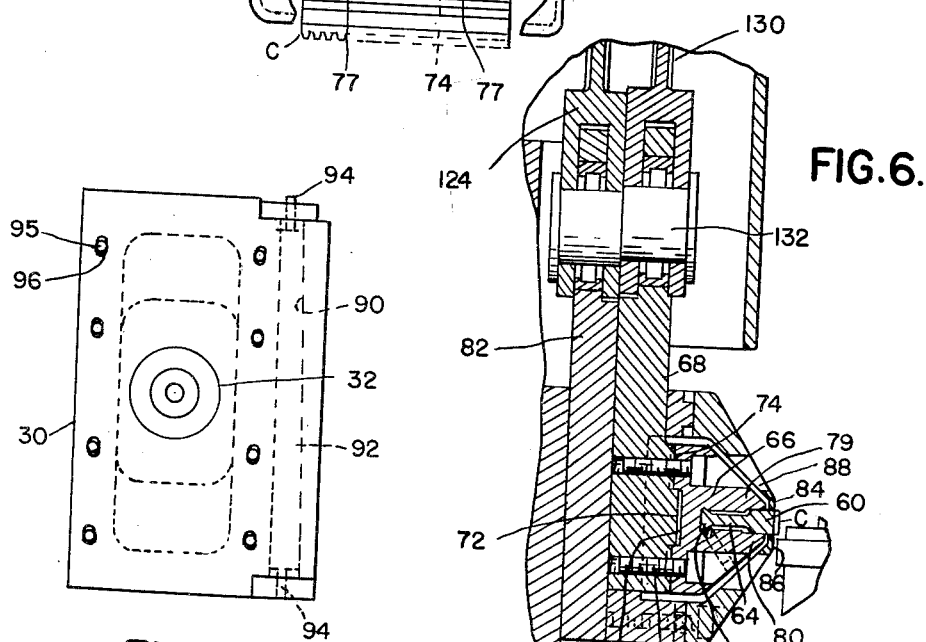
FIG.6.
FIG.5.
INVENTOR.
WALTER S. PRAEG
BY
Whittemore, Hulbert
& Belknap
ATTORNEYS Patented Dec. 15, 1953

2,662,449

UNITED STATES PATENT OFFICE 2,662,449

GEAR SHAPING MACHINE

Walter S. Praeg, Detroit, Mich., assignor, by mesne assignments, to The Fellows Gear Shaper Company, Springfield, Vt., a corporation of Vermont Application November 30, 1949, Serial No. 130,244

3 Claims. (Cl. 90—8)

The present invention relates to a gear shaping machine.

It is an object of the present invention to provide a gear shaping machine designed to employ a rack type cutter for shaper cutting either spur or helical gears.

It is a further object of the present invention to provide a gear shaping machine employing a gear shaper cutter of rack type in which the toothed portion is flexible in use so as to introduce cutting clearance.

It is a further object of the present invention to provide a simplified gear cutting machine characterized by the use of a master spur rack and a spur type cutter, employing a master gear of a helix angle selected in accordance with the helix angle of the teeth to be cut on a gear blank.

Other objects and features of the invention will become apparent as the description proceeds, especially when taken in conjunction with the accompanying drawings, wherein:

Figure 3 is an elevational view of the work supporting fixture showing the relationship between the gear blank and cutter and the master gear and rack.

Figure 4 is a fragmentary plan view partly in section on the line 4—4, Figure 2.

Figure 5 is a plan view of the work support tooling.

Figure 6 is an enlarged sectional view of the cutter and cutter actuating mechanism.

The gear shaping machine illustrated in the figures comprises a base 10 having longitudinal ways indicated generally at 12 for supporting a tool head 13, and parallel longitudinal ways indicated generally at 14 for supporting a work carriage 15.

Figure 1:
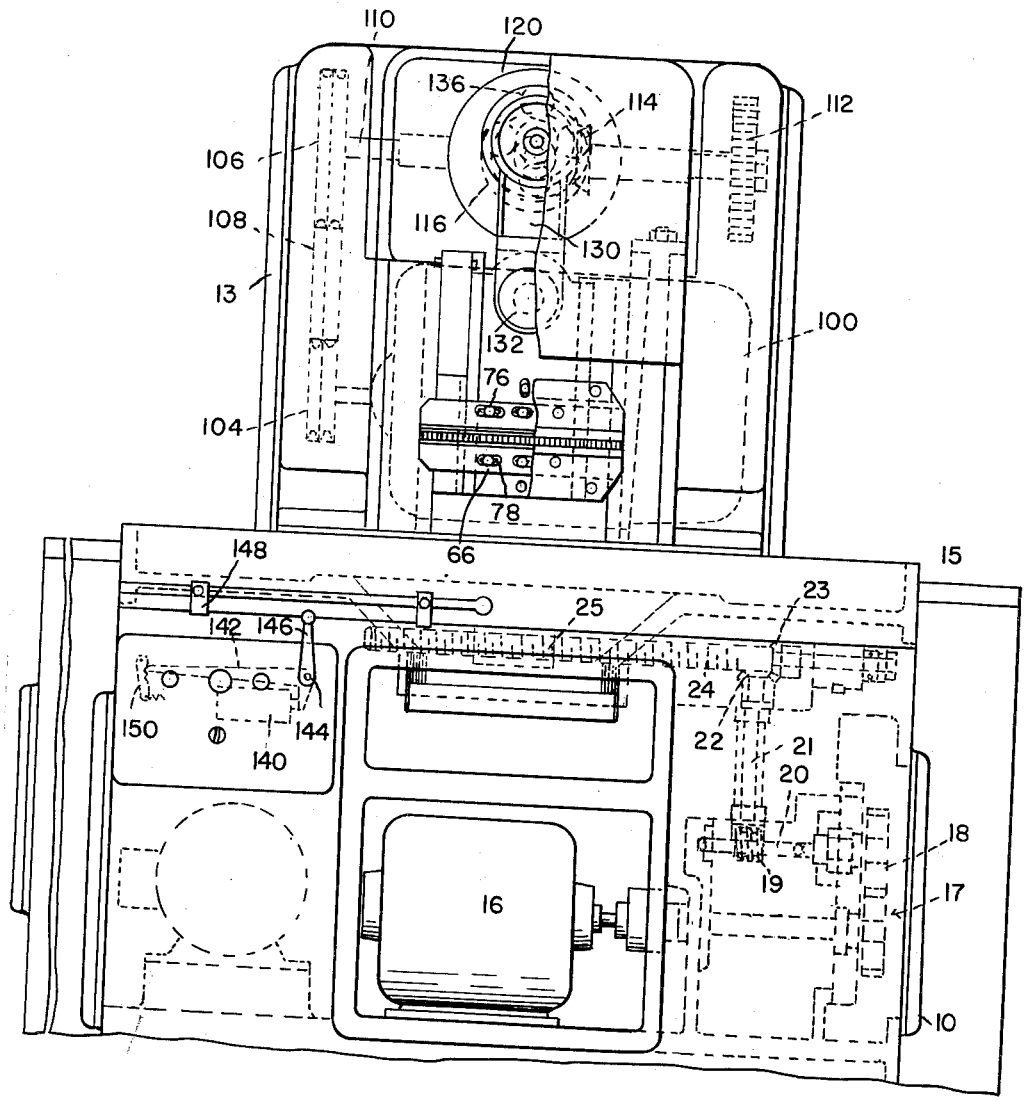
Figure 1 is a front elevation of a gear shaping machine constructed in accordance with the present invention with parts broken away.

As best seen in Figure 1, the base or frame 10 houses a motor 16 which through suitable change gears 17 and 18 drives a worm 19 which in turn drives a worm gear 20 secured to the vertically extending shaft 21 which at its upper end carries a bevel gear 22. This gear drives a second bevel gear 23 connected to a feed screw 24 engaging a feed nut 25 secured to the underside of the work carriage 15. Obviously, the motor is thus effective to reciprocate the work carriage 15 along the ways 14.

Carried by the work table 15 is a work supporting fixture or tooling device 30 which includes a cylindrical housing 32 for supporting a spindle 34. Suitable bearings are provided to permit free rotation of the spindle 34 in the fixture 30. Means are provided adjacent the upper end of the spindle 30 for supporting one or a plurality of gear blanks to be cut, one of these gear blanks being indicated at W. At its lower end the spindle 34 carries a master gear 36.

Figure 2:
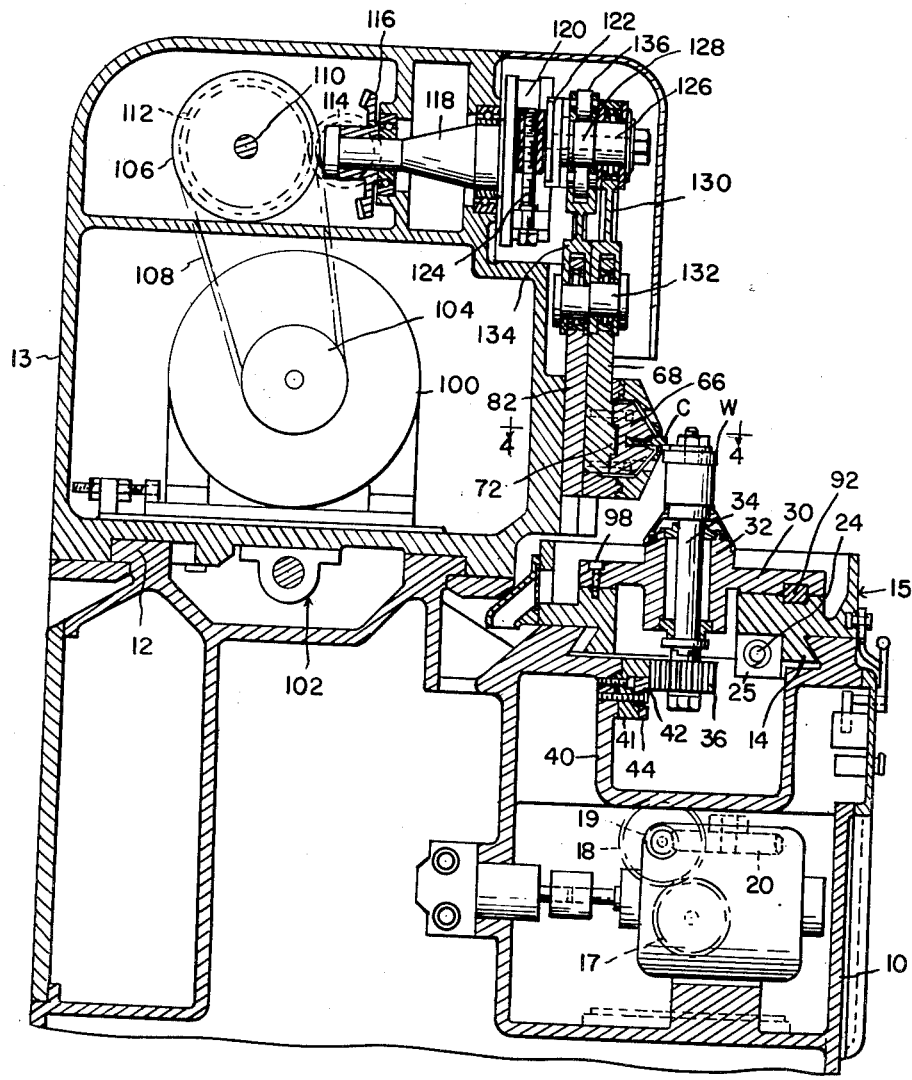
Figure 2 is a transverse sectional view of the machine illustrated in Figure 1.

Located inside an elongated recess 40 provided in the base 10 is a master rack which comprises a first stationary rack portion 41 rigidly bolted as indicated in Figure 2, to the base. Adjacent the underside of the rack portion of the member 41 is a second rack element 42 which is mounted for adjustment in a direction parallel to the direction of the racks 41 and 42. The rack portion 42 is secured in place by bolts which extend through elongated slots formed in the rack member 42 so that backlash between the master rack and master gear 36 may be eliminated. Preferably, below the rack portion 41 is a master bar 44 and in setting up, a master roll or cylinder may be secured on the lower end of the spindle 34 and brought into contact with the master bar 44. The master roll rolling with the master bar 44 will have the same pitch diameter as the master rack and hence the same pitch diameter as that of the gear to be cut.

In Figure 2 for purposes of clarity, the master gear 36 and hence the gear to be cut, is illustrated as a spur gear. However, the invention is directed primarily to the production of helical gears and for this purpose the master gear 36 will normally be a helical gear having the same helix angle as the helix angle desired to be cut on the gear blank. The relationship is best illustrated in Figure 3 in which a work supporting fixture or tooling device is indicated at 50 as comprising a cylindrical housing 52 in which is mounted a spindle 54 similar in all respects to the spindle 34 previously described. In this case however, the master gear 56 is a helical gear designed to mesh with the master rack 41, 42. Shaping of the gear is effected by a rack-like gear shaper cutter C which has spur teeth formed thereon.

The relationship between the cutter C, the gear blank W, the master gear 56 and the master rack 41, 42 controls the type of gear being cut. The pitch diameter of the gear W will of course necessarily be equal to the effective pitch diameter of the master gear 56. The pitch and tooth characteristics of the gear W will depend upon the tooth characteristics of the cutter C. It is thus unnecessary to have the same number of teeth in the master gear as are formed in the work gear W, and in fact it may be desirable to employ a fine pitch master gear and rack so as to increase rigidity and fineness of control.

For practical reasons it will ordinarily be preferable to provide a separate removable and replaceable work supporting fixture for each different helix angle of gear. However, it is within the contemplation of the present invention that the cylindrical housing 52 may be adjustably supported on the fixture and for this purpose there is indicated in dotted lines at 58 a circular plate or pair of plates to which the cylindrical housing 52 may be adjustably secured, in such case as will be obvious to those skilled in the art, the adjustable cylindrical housing 52 may be provided with a circular plate or plates having arcuate slots through which suitable clamping bolts may extend into the corresponding circular plate or plates provided on the fixture.

In order to obtain the full benefit of the present invention a flexible rack type cutter is employed.

Referring now to Figure 6, the cutter C comprises a toothed bar 60, a base bar 62, and a flexible web 64 interconnecting the bars. The cutter C is rigidly mounted in a block 66 carried by a vertically movable slide 68 for imparting vertical reciprocation thereto. The block 66 is bolted to the front face of the slide 68 and has a recess 70 for receiving a forwardly projecting rib 72 on the front surface of the slide 68. Above and below the recess 70 and the rib 72, the block 66 and the slide 68 are provided with inclined surfaces 74 as is more apparent from an inspection of Figure 4. The rib 72 has clearance with respect to the bottom of the recess 70 so that the block 66 takes bearing against the inclined surfaces on the slide when the bolts 76 are tightened down. As best seen in Figure 1, the bolts 76 extend through laterally elongated slots 78 formed in the block 66. When the bolts 76 are loosened the block 66 may be adjusted longitudinally of the rack by screws 77 so as to effect slight adjustment of the cutter C in a direction toward or away from the gear blank W. Such adjustment is desirable in order to compensate for regrinding the cutter. It will be observed that the forwardly extending portion of the block 66 comprises a pair of abutments 79 and 80 which are spaced from the tooth bar 60 when the cutter is in intermediate position. Means are provided for flexing the cutter against one or the other abutments 79 or 80, depending upon the direction of reciprocation, and the abutments therefore determine the amount of cutting clearance which is thus introduced. By this construction it is possible to cut on both the up and the down stroke which greatly increases the productivity of the machine.

Additional means are provided for effecting adjustment of the work supporting fixture 30 (or 50) toward and away from the cutter C. For this purpose the fixture 30 is provided with an inclined slot 90 in which is received a key 92. The fixture 30 is provided with adjustment screws 94. When one of the screws 94 is retracted and the opposite one advanced, the fixture 30 is moved longitudinally relatively to the key 92, thus effecting a very fine adjustment toward or away from the cutter. The fixture is provided with elongated slots 96 through which the locking screws 98 extend so as to permit the aforesaid adjustment.

The means for flexing the cutter against one or the other of the abutments 79 or 80 comprises a preflex slide 82 which has portions slidably related to the cutter slide 68. Extending forwardly from the preflex slide 82 are preflex fingers 84 and 86. These fingers are adapted to lie close to the upper and lower sides of the tooth bar 60 respectively. Sufficient clearance exists between the fingers and the tooth bar to permit rocking of the tooth bar into position with either the upper abutment 79 or the lower abutment 80. The members carrying the fingers 84 and 86 are provided with openings 88 therethrough to afford access to the heads of the bolts 76 so that the block 66 may be loosened and adjusted without removing the preflexing fingers.

The means for effecting the cutting stroke of the cutter, as best illustrated in Figure 2, comprises a motor 100 mounted in the cutter head. As previously stated, the cutter head is adjusted along the ways 12 and for effecting this adjustment a conventional feed screw and nut indicated generally at 102 is provided. This is a hand adjustment and is to place the cutter head 13 in proper position when a fixture for supporting a helical gear is used on the machine. The motor 100 is provided with a pulley 104 which drives a second pulley 106 through a V-belt or the like 108. The pulley 106 is secured to a transversely extending shaft 110 which at its opposite end carries a gear 112 meshing with a companion gear 114 carrying a bevel gear which drives the bevel gear 116 keyed or otherwise secured to the shaft 118 118. At the front of the machine the shaft 118 has a head 120 thereon including ways for adjustably mounting a crank supporting slide 122, this slide being adjustable to vary the throw of the crank by an adjusting bolt 124. Extending forwardly from the slide 122 is a drive pin which includes a cylindrical portion 126 and a camming portion 128. The cylindrical portion 126 has a link 130 secured thereto which is connected by means of a pivot connection 132 to the cutter slide 68. The preflex slide 82 has connected thereto a link 134 carrying at its upper end a plurality of rollers 136 engaging the cam 128. The cam 128 is provided with a substantially 180 degrees raised portion and as the crank revolves it effects relative movement between the slides 68 and 82. The arrangement is such that on the downstroke of the cutter C the cutter bar is flexed upwardly against the stop 78 so as to introduce cutting clearance in back of the cutting edges. When the cutter reaches its lowermost position and is in clearance with respect to the work piece, relative movement between the slides 68 and 82 causes the preflexing finger 84 to force the cutter downwardly into engagement with the abutment 80, thus conditioning the cutter for a subsequent cutting stroke in the upper direction.

Suitable automatic means are provided for controlling a cycle of the machine and include a control switch 140 for the motor 16. There is provided a lever 142 pivoted as indicated at 144 and comprises an upwardly extending hand lever 146 including a portion in position to be engaged by one or the other of the adjustable dogs 148. The lever 142 includes a portion engaging a spring pressed lever 150 having recesses formed therein for engagement with the hand of the lever so as to retain it in either limiting position. Obviously, this arrangement permits a cutting cycle to be carried out and automatically terminated when the work carriage reaches a predetermined limiting position. If desired, the next cycle may be accompanied by a return reciprocation of the work carriage.

As a result of the present invention it is possible to use a single spur type rack for cutting a series of gears of different helix angles. Moreover, it is possible to employ a spur cutter of flexible type. While it is possible to cut helical gears with a flexible cutter having inclined teeth, this results in non-uniform cutting action since the rocking of the cutting teeth into clearance position is accompanied by a lateral displacement relative to the work so that there is a tendency for such inclined rack type cutter teeth to cut more heavily first on one side and then the other side of the engaged gear teeth.

Moreover, the present apparatus provides for great simplification and reduction of number of parts necessary to carry out production of a number of different gears. Thus, the master rack may be a permanent part of the machine and it is only necessary to have a series of master gears of the same pitch as the master rack and of the pitch diameters of the gears which it is desired to cut. Thus, a single master gear may be employed in cutting gears of different pitch so long as helix angle and operating pitch diameter are the same.

The drawings and the foregoing specification constitute a description of the improved gear shaping machine in such full, clear, concise and exact terms as to enable any person skilled in the art to practice the invention, the scope of which is indicated by the appended claims.

What I claim as my invention is:

1. A gear shaping machine comprising a base, ways on said base, a work carriage slideable on said ways, means to feed said work carriage on said ways, work supporting means mounted on said carriage, means on said work supporting means to support a work blank, a master gear similar to said work blank to be cut connected to said work supporting means, a master rack having teeth meshing with the teeth of said master gear so as to impart a generating roll to said work blank, a cutter slide reciprocable relative to said work supporting means, means to reciprocate said cutter slide, a cutter having a tooth carrying portion with teeth extending substantially parallel to the teeth of said master rack, said cutter having a base portion fixed to said cutter slide and spaced from said tooth carrying portion and joined thereto by a flexible web and means for adjusting the angularity of said work supporting means relative to the direction of reciprocation of said cutter slide in accordance with the teeth to be formed on said work blank.

2. A gear shaper as defined in claim 1 in which said master rack is in the form of a spur rack and said master gear is a helical gear and with the cutter being of spur type with its teeth extending parallel to the teeth of said rack.

3. A gear shaper as defined in claim 2 which has an abutment adjacent to the tooth carrying portion of said cutter to limit the deflection thereof.

WALTER S. PRAEG.

References Cited in the file of this patent
UNITED STATES PATENTS

| Number | Name | Date |
|---|---|---|
| 1,438,530 | Jones | Dec. 12, 1922 |
| 2,130,055 | Aeppli | Sept. 13, 1938 |
| 2,222,703 | Forster | Nov. 26, 1940 |
| 2,325,696 | Meier | Aug. 3, 1943 |
| 2,386,572 | Pigott | Oct. 9, 1945 |
| 2,432,020 | Laesser | Dec. 2, 1947 |